(No Model.)
W. O. TALCOTT.
BELT FASTENER.
No. 379,739. Patented Mar. 20, 1888.
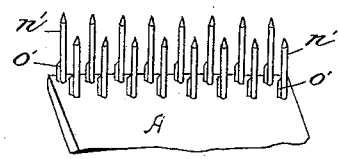
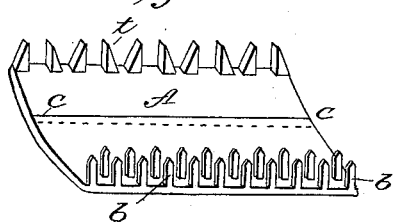
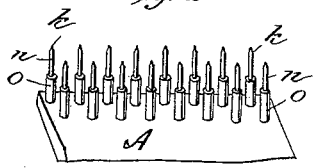
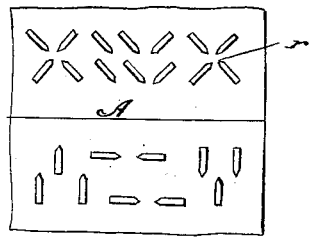
Attest:
Walter Donaldson
F. L. Middleton.
Inventor
Walter O. Talcott,
by Ellis Spear,
Atty.

UNITED STATES PATENT OFFICE.

WALTER O. TALCOTT, OF PROVIDENCE, RHODE ISLAND.

BELT-FASTENER.

SPECIFICATION forming part of Letters Patent No. 379,739, dated March 20, 1888.

Application filed May 18, 1887. Serial No. 238,584. (No model.)

*To all whom it may concern:*

Be it known that I, WALTER O. TALCOTT, of the city and county of Providence and State of Rhode Island, have invented certain Improvements in Belt-Hooks, of which the following is a specification.

My improvements relate to that class of belt-fasteners consisting of a metallic plate provided with teeth to be driven into the belt.

The utility of the hook depends upon the hold which teeth take upon the material of the belt into which they are driven. The plate which carries the teeth being rigid, there is a constant tendency for the teeth to work out as the belt is alternately bent around the pulleys and straightened out on leaving the pulley. Some attempts have been made to meet this difficulty by inclining the teeth forward, and also by adapting them to clinch; but this prevents the removal of the hook without injury to the belt or to the hook, or to both. I have discovered from repeated experiments with this class of hooks that the form of tooth best adapted for the service required is that which preserves a uniform diameter throughout the entire portion of the tooth which is depended upon to hold in the belt—that is to say, a tooth all of whose sides shall be parallel from its base toward its point or outer end far enough to give a firm hold on the belt.

In the accompanying drawings I have illustrated several forms of teeth of my invention, all possessing the characteristic of parallel sides, above described, throughout the body or holding part of the tooth.

Figure 1 represents one form of teeth made according to my invention. Fig. 2 represents another form. Fig. 3 shows a combination-plate, one side having teeth of my invention combined with wedge-shaped clinching-teeth on the other, also showing the line on which the ends of the belt should meet, and also the middle line of the plate. Fig. 4 represents the combination-plate with the points clinched in various directions.

A is the metallic plate, usually slightly curved to accommodate it to the round of the pulley.

$c\ c$ represents a slight V-shaped depression or groove indicating the line where the contiguous ends of the belt meet, though this may be a bead raised along the same line and for the same purpose, it being only necessary to provide a guide for the eye in applying the belt, at the same time avoiding any elevation sufficient to displace the end of the belt or to prevent it from lying close down upon the inner face of the plate. The teeth $b\ b$ present an oblong rectangle in cross-section, and are brought to an edge at their points, and thereby simply spread the longitudinal fibers of the belt.

The end of the belt having been properly squared, is laid upon the teeth and extended beyond them to the line $c\ c$, and is driven down upon the plate, filling the rectangular spaces between the teeth.

The material of the belt may be said to be divided into rectangular blocks between the teeth, instead of being pressed into partially wedge-shaped portions. In the latter case not only does the form into which the material is pressed aid the tendency of the belt to work up from the plate as it enters upon the pulley and again as it leaves it, but the elasticity of the material being greatest at the face of the plate, in consequence of the greater compression, exaggerates this tendency.

In Fig. 2 I have shown a round tooth, $o$, provided with a round spindle-like extension, $n$, pointed at $k$, and intended to pass through the belt and clinch in any desired direction, as seen in Fig. 4.

I am not aware that round clinching-teeth were ever employed prior to my invention of the same. They have been oblong in cross-section, from which fact there were only two possible directions in which they could be clinched; but it is often desirable to turn a group, as of four points, toward a common center, as at $r$, Fig. 4. The same figure illustrates other plans of clinching groups of points as occasion may require to meet special cases.

$o'$ is an example of a tooth whose body or holding part is oblong, like tooth $b$, Fig. 3, but having the spindle-like extension $n'$, precisely like the extension $n$.

In Fig. 3 I have shown a combination of my straight-sided teeth upon one side of a plate A, with the ordinary self-clinching wedge-shaped teeth $t$ upon the other side. This is sometimes desirable when a narrow plate is required, the single row of self-clinching teeth being often sufficient; but if such teeth were employed upon both sides of the plate the belt could not be detached from the plate and again reapplied to the same belt-hook in consequence of the self-clinching of the teeth in the first application.

By employing a sufficient number of my straight-sided non-clinching teeth upon one side of the plate to equal the holding power of the clinching-teeth upon the other side the belt may be pried off from the straight teeth for the purpose of taking up the stretch of the belt, or any other desired purpose, and again applied to the same teeth.

The spindle-pointed clinching-teeth are especially intended for belts of comparatively loose fiber, as cotton and rubber belts, which may not sufficiently hug the teeth to insure their keeping in place.

What I claim, and desire to secure by Letters Patent, is—

1. A belt-hook having teeth provided with base portions and cylindrical pointed extensions or elongations adapted to pass through the belt and clinch in any direction on the inside of the belt, substantially as described, for the purpose specified.

2. The belt-hook herein described, provided with clinchable teeth upon one side of the central line and non-clinchable teeth upon the opposite side, said non-clinchable teeth being of uniform cross sectional area throughout their body portion, substantially as described.

WALTER O. TALCOTT.

Witnesses:
CHAS. E. SALISBURY,
JOHN W. HOGAN.